US011130897B2

(12) United States Patent
Jamison et al.

(10) Patent No.: US 11,130,897 B2
(45) Date of Patent: Sep. 28, 2021

(54) THERMALLY RESPONSIVE VISCOSIFIERS IN SUBTERRANEAN OPERATIONS

(71) Applicant: Halliburton Energy Services, Inc., Houston, TX (US)

(72) Inventors: Dale E. Jamison, Humble, TX (US); Preston Andrew May, Porter, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/710,274

(22) Filed: Dec. 11, 2019

(65) Prior Publication Data

US 2021/0179912 A1 Jun. 17, 2021

(51) Int. Cl.
| | |
|---|---|
| *C09K 8/12* | (2006.01) |
| *E21B 21/06* | (2006.01) |
| *C09K 8/08* | (2006.01) |
| *E21B 33/138* | (2006.01) |
| *E21B 21/00* | (2006.01) |

(52) U.S. Cl.
CPC ............... *C09K 8/12* (2013.01); *C09K 8/08* (2013.01); *E21B 21/003* (2013.01); *E21B 21/06* (2013.01); *E21B 33/138* (2013.01)

(58) Field of Classification Search
CPC .......... E21B 43/12; E21B 43/10; E21B 43/32; E21B 33/12; E21B 33/14
See application file for complete search history.

(56) References Cited

U.S. PATENT DOCUMENTS

| | | | |
|---|---|---|---|
| 6,316,011 | B1 | 11/2001 | Ron et al. |
| 8,215,393 | B2 | 11/2012 | Mackay et al. |

(Continued)

FOREIGN PATENT DOCUMENTS

| | | |
|---|---|---|
| JP | H06206954 A | 7/1994 |
| WO | 2001066600 A1 | 9/2001 |

(Continued)

OTHER PUBLICATIONS

International Search Report and Written Opinion issued in related PCT Application No. PCT/US2019/066157 dated Sep. 8, 2020, 9 pages.

*Primary Examiner* — Zakiya W Bates
(74) *Attorney, Agent, or Firm* — Tenley Krueger; Baker Botts L.L.P.

(57) ABSTRACT

Methods for the use of treatment fluids that include thermally responsive viscosifiers in subterranean formations are provided. In one embodiment, the methods include introducing a treatment fluid including an aqueous base fluid and a thermally responsive hydrogel including at least one thermoresponsive polymer into at least a portion of a subterranean formation; allowing the thermally responsive hydrogel to reach a thickening transition temperature, wherein the thermally responsive hydrogel undergoes a liquid-to-solid phase change at or above the thickening transition temperature; and allowing the treatment fluid to at least partially solidify in the subterranean formation, wherein the solid thermally responsive hydrogel is present in the treatment fluid in an amount from about 0.01 to about 0.2 by volume fraction of solids of the treatment fluid.

20 Claims, 8 Drawing Sheets

(56) References Cited

U.S. PATENT DOCUMENTS

| | | |
|---|---|---|
| 8,685,900 B2 | 4/2014 | Ezell et al. |
| 9,157,306 B2 | 10/2015 | Miller et al. |
| 9,587,158 B2 | 3/2017 | Livanec et al. |
| 9,598,927 B2 | 3/2017 | Villarreal, Jr. et al. |
| 2004/0244978 A1 | 12/2004 | Shaarpour |
| 2012/0264655 A1 | 10/2012 | Fitch et al. |
| 2016/0220725 A1 | 8/2016 | Whalen, III et al. |
| 2016/0369151 A1 | 12/2016 | Livanec et al. |
| 2017/0335175 A1 | 11/2017 | Oliveira et al. |
| 2018/0360743 A1 | 12/2018 | Bartynski et al. |
| 2019/0145223 A1 | 5/2019 | Van Oort et al. |
| 2020/0142091 A1* | 5/2020 | Bhongale ................ G01V 3/28 |

FOREIGN PATENT DOCUMENTS

| | | |
|---|---|---|
| WO | 2012/142235 A1 | 10/2012 |
| WO | 2015/013306 A1 | 1/2015 |
| WO | 2018/111222 A1 | 6/2018 |
| WO | 2018232384 A1 | 12/2018 |

* cited by examiner

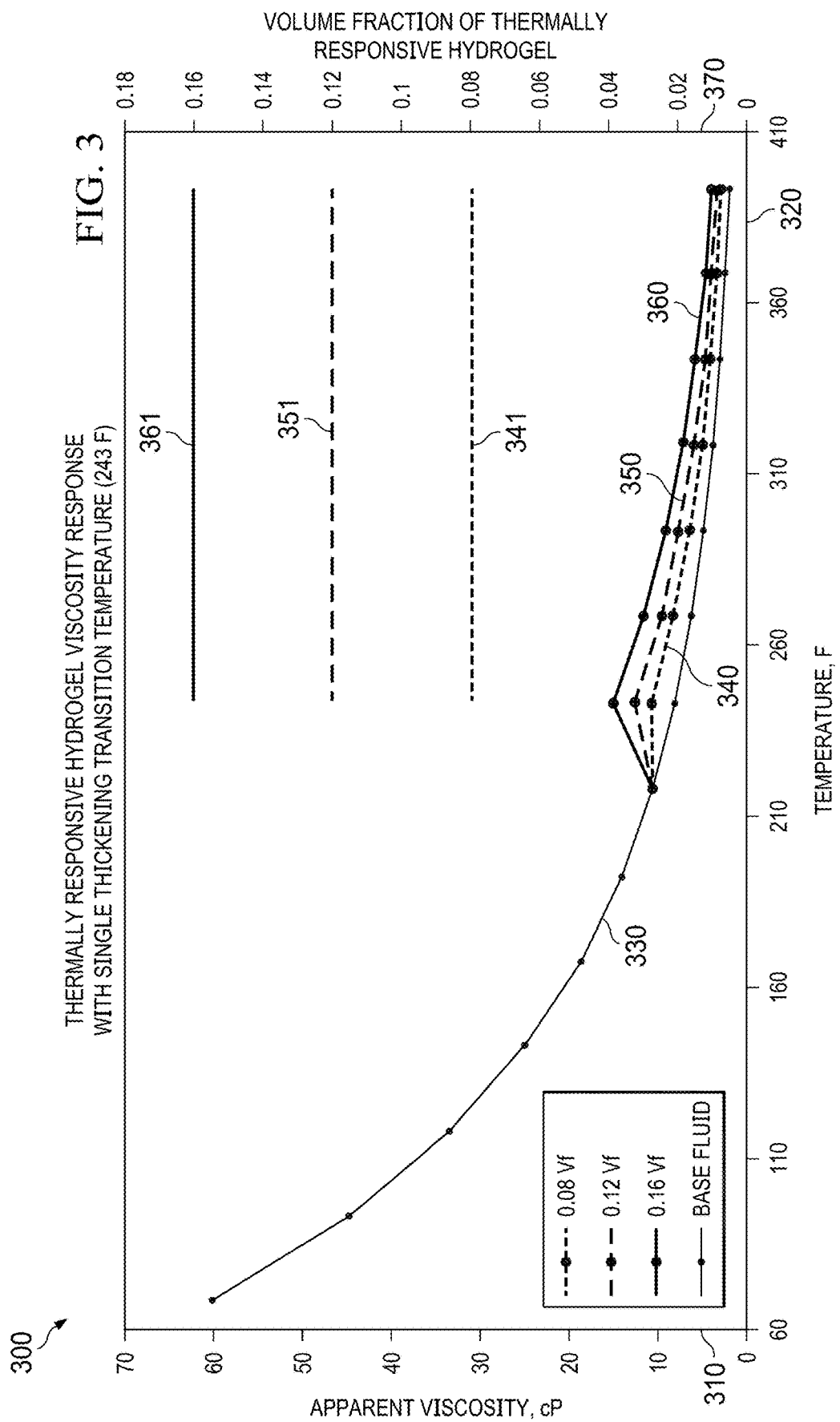

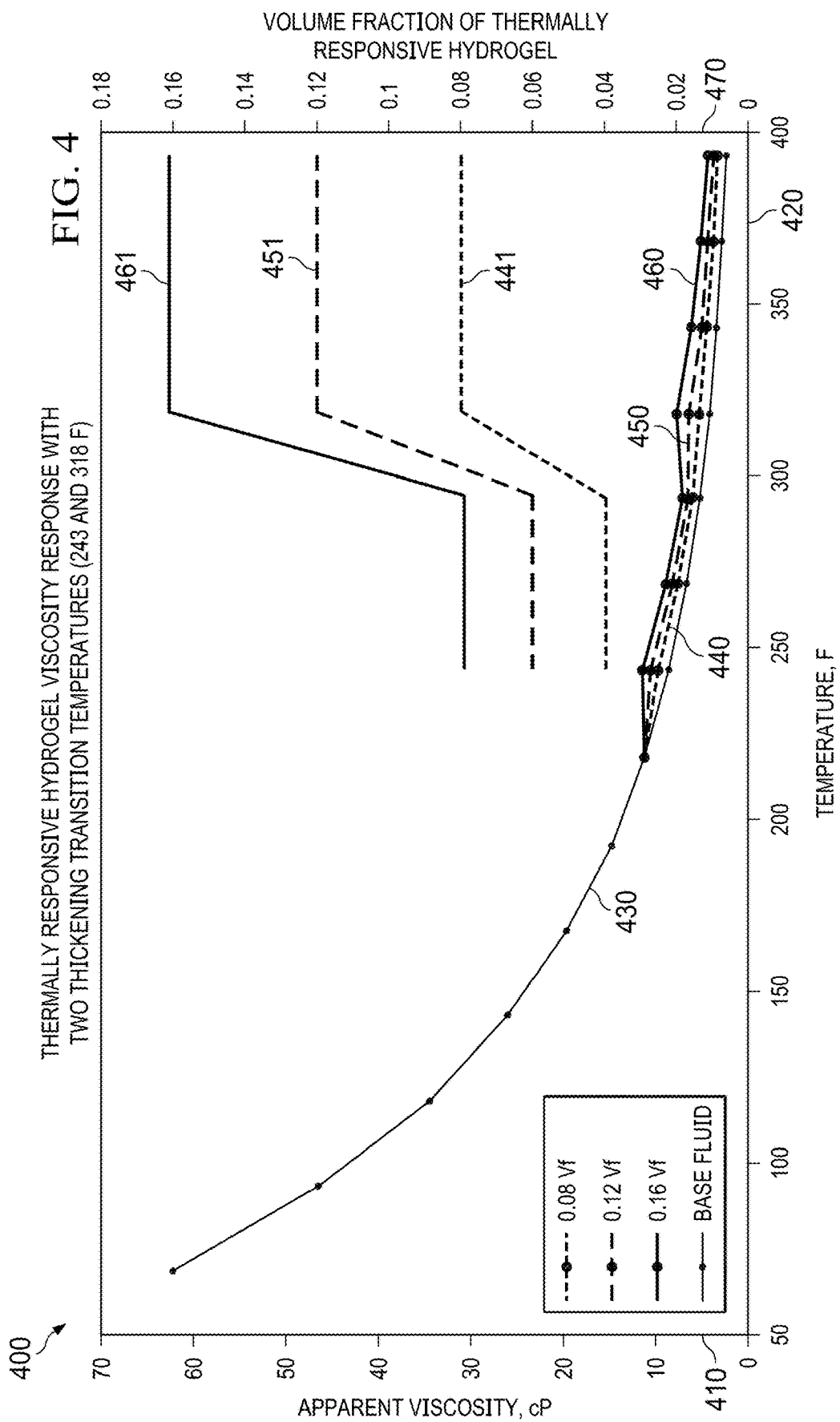

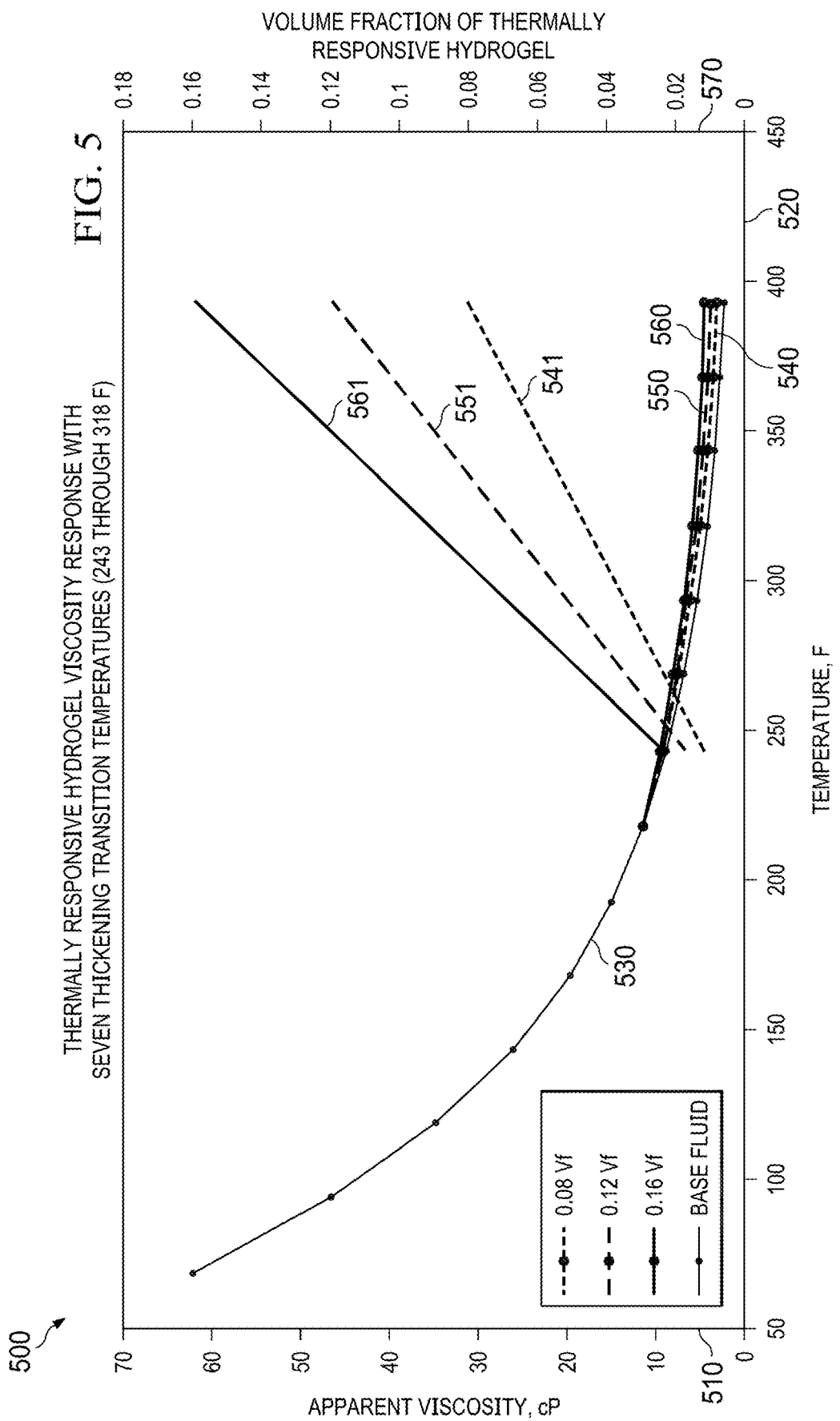

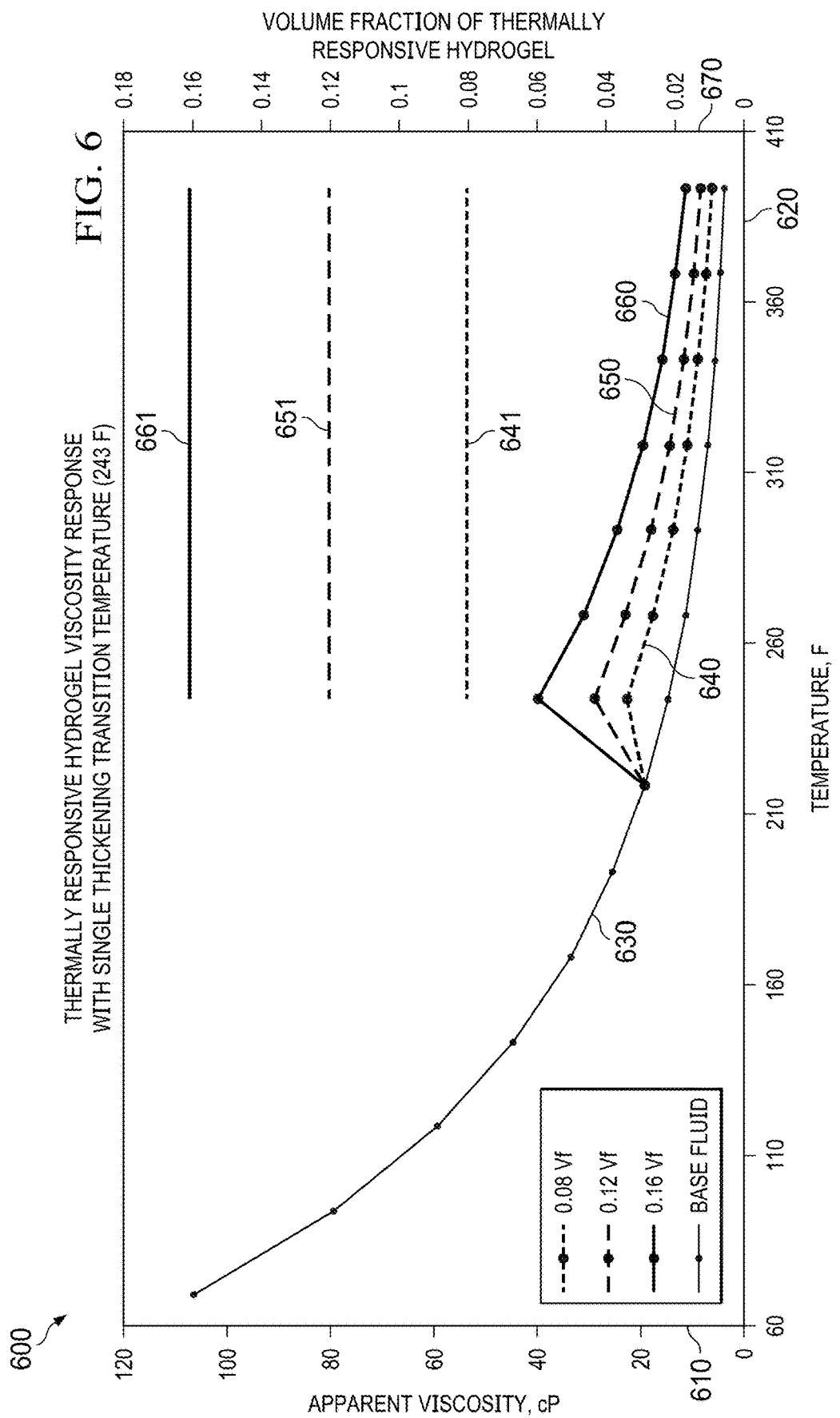

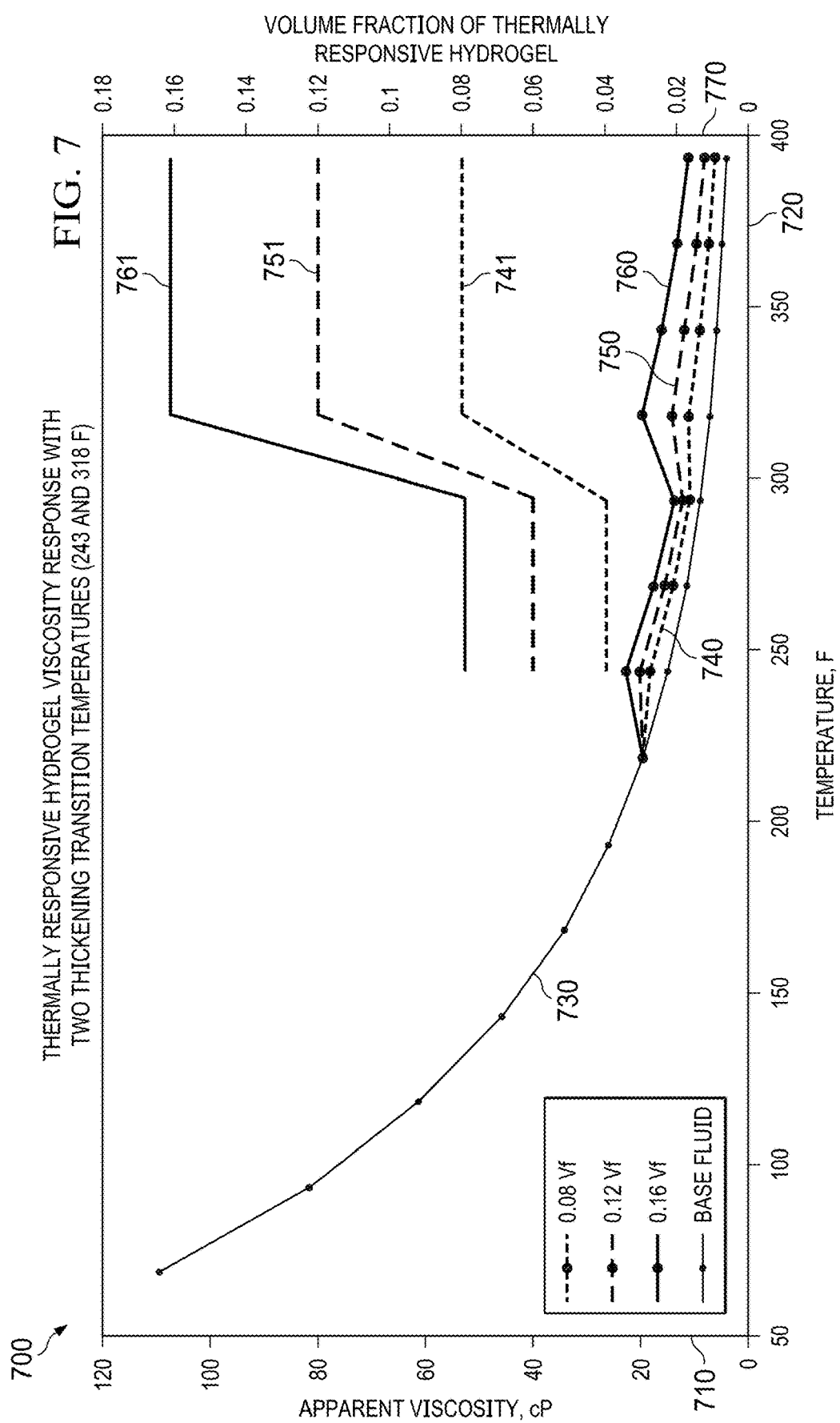

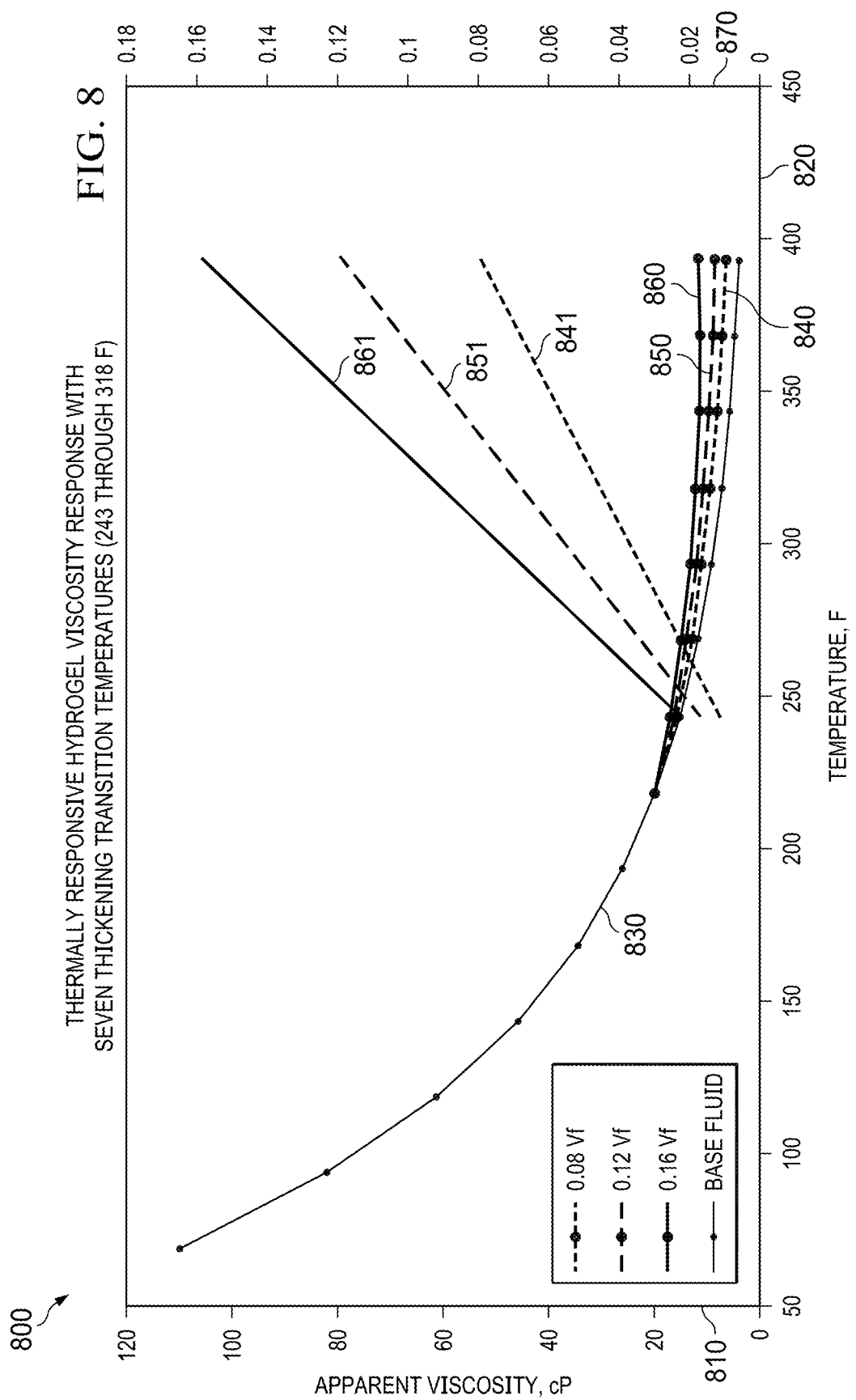

THERMALLY RESPONSIVE VISCOSIFIERS IN SUBTERRANEAN OPERATIONS

CROSS-REFERENCE TO RELATED APPLICATIONS

The present application is related to co-pending U.S. application Ser. No. 16/710,399 filed on Dec. 11, 2019, entitled "Thermally Responsive Anti-Sag Agents," and U.S. application Ser. No. 16/710,342 filed on Dec. 11, 2019, entitled "Thermally Responsive Lost Circulation Materials," which granted on Mar. 30, 2021 as U.S. Pat. No. 10,961,431, both of which are filed concurrently herewith, the entire disclosures of which are incorporated herein by reference.

BACKGROUND

The present disclosure relates to methods for treating subterranean formations, and to methods for using treatment fluids that include certain viscosifiers in subterranean formations.

Treatment fluids often contain additives to impart desired physical and/or chemical characteristics to the fluid. Such additives may include viscosifiers, and treatment fluids that include viscosifiers may be used in a variety of subterranean treatments and oilfield operations.

Maintaining sufficient viscosity in treatment fluids may be important for a number of reasons. Viscosity is desirable in drilling operations since treatment fluids with higher viscosity can, among other things, transport solids, such as drill cuttings, more readily. Maintaining sufficient viscosity is important in fracturing treatments for particulate transport, as well as to create or enhance fracture width. Particulate transport is also important in sand control treatments, such as gravel packing. Maintaining sufficient viscosity may be important to control and/or reduce leak-off into the formation, improve the ability to divert another fluid in the formation, and/or reduce pumping requirements by reducing friction in the well bore. At the same time, while maintaining sufficient viscosity of a treatment fluid often is desirable, it also may be desirable to maintain the viscosity of the treatment fluid in such a way that the viscosity may be reduced at a particular time, inter alia, for subsequent recovery of the fluid from the formation.

To provide the desired viscosity, polymeric viscosifiers are commonly added to the treatment fluids. A viscosifier may include any substance that is capable of increasing the viscosity of a fluid, for example, by forming a gel and/or solid. Examples of commonly used polymeric viscosifiers include, but are not limited to guar gums and derivatives thereof, cellulose derivatives, biopolymers, and the like. In high temperature wells, drilling fluid viscosity can be difficult to control with polymeric viscosifiers alone. In some cases, clay material may be added to increase the viscosity of the drilling fluid at high temperatures. However, these materials can damage formations and may be undesirable in production zones.

BRIEF DESCRIPTION OF THE DRAWINGS

These drawings illustrate certain aspects of some of the embodiments of the present disclosure and should not be used to limit or define the claims.

FIG. 3 is a plot of data relating to the viscosity of a 12.0 lbs/gal drilling fluid including a thermally responsive hydrogel with a single thickening transition temperature, in accordance with certain embodiments of the present disclosure;

FIG. 4 is a plot of data relating to the viscosity of a 12.0 lbs/gal drilling fluid including a thermally responsive hydrogel with two thickening transition temperatures, in accordance with certain embodiments of the present disclosure;

FIG. 5 is a plot of data relating to the viscosity of a 12.0 lbs/gal drilling fluid including a thermally responsive hydrogel with seven thickening transition temperatures, in accordance with certain embodiments of the present disclosure;

FIG. 6 is a plot of data relating to the viscosity of a 16.0 lbs/gal drilling fluid including a thermally responsive hydrogel with a single thickening transition temperature, in accordance with certain embodiments of the present disclosure;

FIG. 7 is a plot of data relating to the viscosity of a 16.0 lbs/gal drilling fluid including a thermally responsive hydrogel with two thickening transition temperatures, in accordance with certain embodiments of the present disclosure; and FIG. 8 is a plot of data relating to the viscosity of a 16.0 lbs/gal drilling fluid including a thermally responsive hydrogel with seven thickening transition temperatures, in accordance with certain embodiments of the present disclosure.

Figure 1:
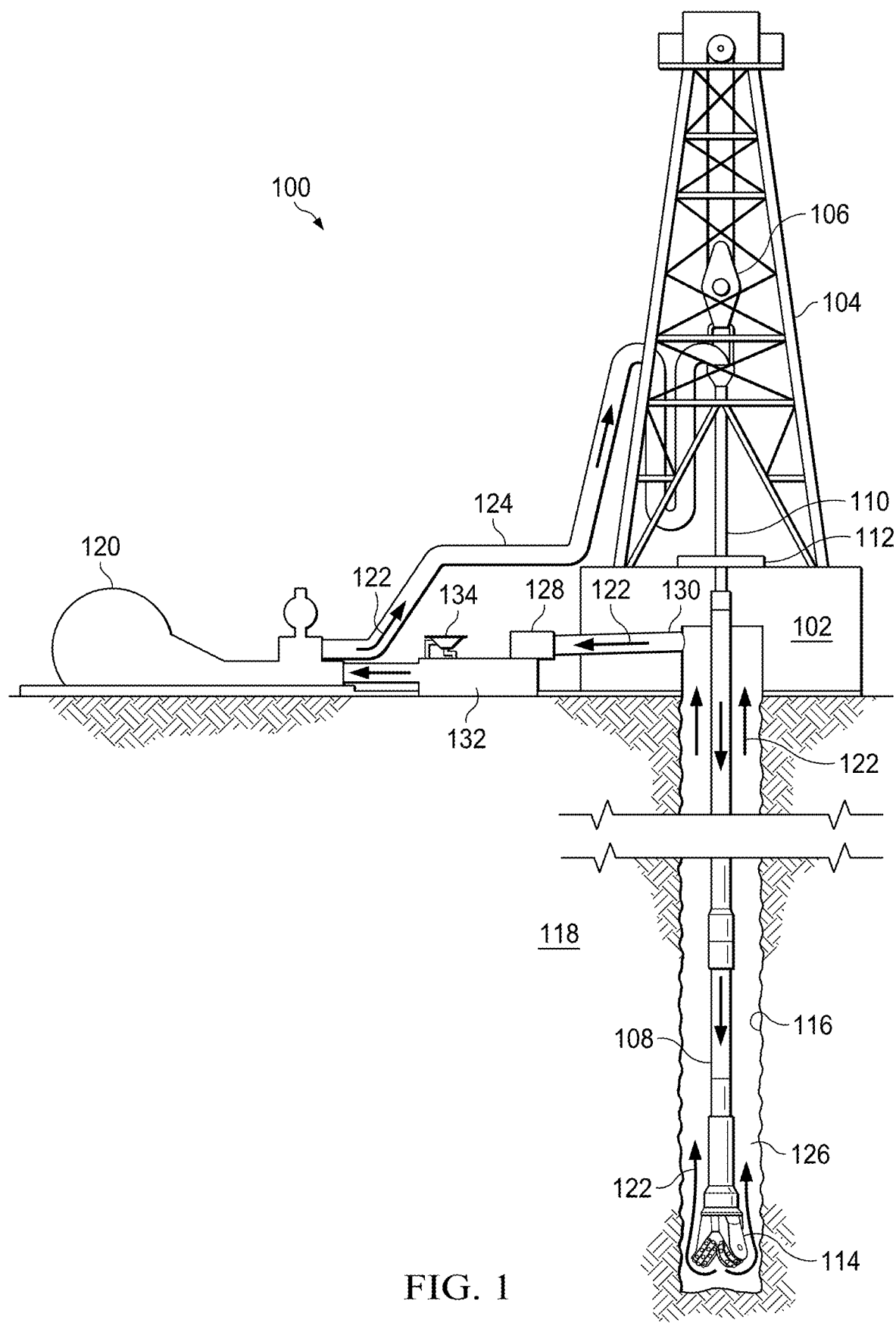
FIG. 1 is a schematic diagram of a wellbore drilling assembly used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods for treating subterranean formations, and to methods for using treatment fluids that include thermally responsive viscosifiers in subterranean formations. More specifically, the present disclosure provides methods for introducing a treatment fluid that includes an aqueous base fluid and a thermally responsive hydrogel into a location (e.g., at least a portion of a subterranean formation). In some embodiments, the thermally responsive hydrogel may include at least one thermoresponsive polymer. In some embodiments, a drilling fluid that includes the aqueous base fluid and the thermally responsive hydrogel may be used to drill at least a portion of a wellbore in a subterranean formation. In certain embodiments, the thermally responsive hydrogel may include a thermoresponsive polymer that may undergo an at least partially reversible thickening transition at about, or above, a thickening transition temperature.

Among the many advantages to the methods of the present disclosure, only some of which are alluded to herein, certain embodiments of the methods of the present disclosure may, among other benefits, provide for high temperature viscosity in an aqueous fluid (e.g., an aqueous fluid located in a subterranean formation) by undergoing a thickening transition at a temperature. In certain embodiments, the thermally responsive hydrogels of the present disclosure may provide an enhanced ability to thicken aqueous-based fluids at high-temperatures as compared to certain other viscosifiers, at least in part due to a reversibility of the thickening transition. In some embodiments, the thermally responsive hydrogels of the present disclosure may provide more effective thickening of aqueous-based fluids because the thickening transition corresponds to a phase change of the thermally responsive hydrogels, and not a chemical reaction as in certain other viscosifiers. In certain embodiments, the thermally responsive hydrogels of the present disclosure may provide an enhanced ability to thicken aqueous-based fluids in oilfield operations by providing the ability to at least partially solidify at high temperatures (e.g. at one or more of the temperature ranges referenced below). In other embodiments, the thermally responsive hydrogels of the present disclosure may provide an enhanced ability to thicken aqueous-based fluids in oilfield operations by providing the ability to return to a liquid state when cooled to a lower temperature. In certain embodiments, the thermally responsive hydrogels of the present disclosure may provide an enhanced ability to thicken aqueous-based fluids in oilfield operations by providing the ability to tune the temperature of the thickening transition by changing the composition of the thermally responsive hydrogel. In some embodiments, the thermally responsive hydrogels of the present disclosure may provide increased high-temperature performance for cuttings transport and/or barite sag as compared to certain other viscosifiers. In other embodiments, the thermally responsive hydrogels of the present disclosure may reduce and/or avoid the need to use clay material in production zones to increase the high temperature viscosity of a fluid. In certain embodiments, this may reduce and/or avoid damage to the subterranean formation.

Without limiting the disclosure to any particular theory or mechanism, it is believed that the thermally responsive hydrogels of the present disclosure may include thermoresponsive polymers that exist, for example, in contracted, coiled states at lower temperatures where they may impart little viscosity to a fluid. In certain embodiments, upon an increase in temperature, the thermoresponsive polymers may un-coil or expand to a point of very high chain entanglement amongst different polymer chains, which may lead to an increase in viscosity of the fluid and/or solidification of the thermally responsive hydrogel. In some embodiments, this transition may initiate at a specific temperature and in some cases may occur relatively rapidly. In other embodiments, at lower temperatures it is believed that intramolecular forces within individual thermoresponsive polymers may dominate and lead to a collapsed structure. In certain embodiments, upon an increase in temperature, the thermal vibrational energy may increase to overcome the intramolecular forces within the individual thermoresponsive polymers and allow intermolecular attractive forces between polymer chains to occur. In turn, this may lead to an increase in viscosity and/or cause solid-state mechanical properties to develop (e.g. stiffness, toughness, and the like).

Treatment fluids often contain additives to impart desired physical and/or chemical characteristics to the fluid. Viscosifiers control and change the viscosity of treatment fluids. Without viscosity control, the viscosity of the treatment fluid could undesirably change as a result of temperature variation during the treatment fluid's transit from the well surface to the bottom of the wellbore and back. The thermally responsive hydrogels of the present disclosure may be used in a variety of applications and environments in which maintaining sufficient viscosity in treatment fluids may be important. Examples of applications suitable for certain embodiments of the present disclosure may include, but are not limited to use in subterranean formations, and/or downhole applications (e.g., drilling, fracturing, completions, oil production). In certain embodiments, the thermally responsive hydrogels may be applicable to injection wells, monitoring wells, and/or production wells, including hydrocarbon or geothermal wells and wellbores. In other embodiments, the thermally responsive hydrogels may be introduced into a subterranean formation, for example, via a wellbore penetrating at least a portion of a subterranean formation. Maintaining sufficient viscosity in treatment fluids is important for a number of reasons, including, but not limited to, particulate transport, wellbore stability, control and/or reduction of fluid loss into the subterranean formation, and/or diversion of the flow of fluids present within the subterranean formation to other portions of the formation.

Treatment fluids can be used in a variety of above ground and subterranean treatment operations. As used herein, the terms "treat," "treatment," "treating," and grammatical equivalents thereof refer to any above ground or subterranean operation that uses a fluid in conjunction with achieving a desired function and/or for a desired purpose. Use of these terms does not imply any particular action by the treatment fluid. Illustrative treatment operations can include, for example, surface facilities operations, fracturing operations, gravel packing operations, acidizing operations, scale dissolution and removal, consolidation operations, and the like.

In certain embodiments, a treatment fluid including an aqueous base fluid and a thermally responsive hydrogel may be provided. Depending on the type of treatment to be performed, the treatment fluid may include any treatment fluid known in the art. Treatment fluids that may be useful in accordance with the present disclosure include, but are not limited to, drilling fluids, cement fluids, lost circulation fluids, stimulation fluids (e.g., a fracturing fluids or an acid stimulation fluids), completion fluids, conformance fluids (e.g., water or gas shutoff fluids), sand control fluids (e.g., formation or proppant consolidating fluids), workover fluids, and/or any combination thereof.

The thermally responsive hydrogels of the present disclosure may be dispersed in an aqueous phase of the treatment fluid. In some embodiments, a thermally responsive hydrogel may include a material that is a highly absorbent, three-dimensional network of polymer chains. In some embodiments, the thermally responsive hydrogel may increase the viscosity of a fluid at or above a thickening transition temperature. In other embodiments, at lower temperatures (e.g. a temperature below the one or more thickening transition temperature ranges referenced below) the thermally responsive hydrogel may be part of a continuous phase of the treatment fluid. In some embodiments, the thermally responsive hydrogel may become a solid at high temperatures (e.g. at or above one of the thickening transition temperature ranges referenced below). In certain embodiments, the solid thermally responsive hydrogel may increase the viscosity of the treatment fluid. In some embodiments, the thermally responsive hydrogel may thicken a fluid as the temperature of the fluid increases by undergoing a thickening transition that is an at least partially reversible thickening transition. In certain embodiments, the thickening transition may correspond to a phase change of the thermally responsive hydrogel. In certain embodiments, the phase change may be a liquid to solid phase change. In certain embodiments, the thermally responsive hydrogel may thicken a fluid as the temperature of the fluid increases without a chemical reaction occurring.

In certain embodiments, the thermally responsive hydrogel may improve the particulate transport of a fluid and/or may mitigate weighting material sag at higher temperatures in a wellbore. In other embodiments, the thermally responsive hydrogel may act as a neutral density particle that may improve sag performance. In certain embodiments, the thermally responsive hydrogel may improve fluid loss control. In other embodiments, the thermally responsive hydrogel may be used in weighted and/or viscous sweeps in high temperature and high pressure (HTHP) wells.

The treatment fluids used in accordance with the methods and compositions of the present disclosure may include an aqueous base fluid. As used herein, the term "base fluid" refers to the major component of the fluid (as opposed to components dissolved and/or suspended therein), and does not indicate any particular condition or property of that fluid such as its mass, amount, pH, etc. Aqueous base fluids that may be suitable for use in the methods and systems of the present disclosure may include water from any source. Such aqueous base fluids may include fresh water, salt water (e.g., water containing one or more salts dissolved therein), brine (e.g., saturated salt water), seawater, and/or any combination thereof. The aqueous base fluids may be from a source that does not contain compounds that adversely affect other components of a fluid. In certain embodiments of the present disclosure, the aqueous base fluids may include one or more ionic species, such as those formed by salts dissolved in water. For example, seawater and/or produced water may include a variety of divalent cationic species dissolved therein.

In certain embodiments, the density of the aqueous base fluid may be adjusted, among other purposes, to provide additional particulate transport and suspension in the compositions of the present disclosure. In certain embodiments, the pH of the aqueous base fluid may be adjusted (e.g., by a buffer or other pH adjusting agent) to a specific level, which may depend on, among other factors, the types of thermally responsive hydrogels, and/or other additives included in the fluid. One of ordinary skill in the art, with the benefit of this disclosure, will recognize when such density and/or pH adjustments are appropriate. In certain embodiments, the treatment fluids may include a mixture of one or more fluids and/or gases, including but not limited to emulsions, foams, and the like.

The thermally responsive hydrogels used in accordance with the methods of the present disclosure may include at least one thermoresponsive polymer. In certain embodiments, the thermoresponsive polymer may include at least one monomer that may include, but is not limited to, N-isopropylacrylamide, hydroxyethyl methacrylate, acrylamide, N,N-diethylacrylamide, N-tert-butylacrylamide, butyl acrylate, ethyl acrylate, propyl acrylate, methacrylamide, methacrylates, methyl vinyl ether, N-vinyl-caprolactam, polypeptides, ethylene oxide, propylene oxide, pluronic F-127, chitosan, any salt thereof, and/or any combination thereof.

In certain embodiments, the thermoresponsive polymer may be a copolymer. In other embodiments, the copolymer may include at least one first monomer and at least one second monomer, and the first monomer and the second monomer may be different monomers. In certain embodiments, the first monomer may be N-isopropylacrylamide. In certain embodiments, the second monomer may be N-tert-butylacrylamide. In certain embodiments, the second monomer may be butylacrylate. In other embodiments, the first monomer may be N-isopropylacrylamide and the second monomer may be N-tert-butylacrylamide. In certain embodiments, the first monomer may be N-isopropylacrylamide and the second monomer may be butylacrylate. In other embodiments, the thermoresponsive polymer may further include one or more other vinyl monomers. In some embodiments, including one or more vinyl monomers in the thermoresponsive polymer may reduce the cost and increase the salt tolerance of the thermally responsive hydrogel.

In certain embodiments, the thermoresponsive polymer may further include one or more other suitable monomers as one of ordinary skill in the art will recognize with the benefit of this disclosure.

In certain embodiments, the thermally responsive hydrogel may include at least one thermoresponsive polymer that includes water and a poly(N-alkylacrylamide) copolymer, where alkyl may refer to a $C_{1-6}$ alkyl group. In other embodiments, the poly(N-alkylacrylamide) copolymer may include a first monomer that is an N-alkylacrylamide and a second monomer that may include, but is not limited to, N-alkylacrylamide, N-isopropylacrylamide, hydroxyethyl methacrylate, acrylamide, N,N-diethylacrylamide, N-tert-butylacrylamide, butyl acrylate, ethyl acrylate, propyl acrylate, methacrylamide, a methacrylate, methyl vinyl ether, N-vinyl-caprolactam, polypeptides, ethylene oxide, propylene oxide, pluronic F-127, chitosan, any salt thereof, and/or any combination thereof. Examples of an N-alkylacrylamide monomer include, but are not limited to, N-isopropylacrylamide, acrylamide, N-ethylacrylamide, N-methylacrylamide, N-n-butylacrylamide and N-tert-butylacrylamide.

In certain embodiments, the thermoresponsive polymer may further include an adhesion-enhancing additive. The adhesion-enhancing additive may include, but is not limited to, an Arg-Gly-Asp-Ser amino sequence (RGDS), one or more guanidine-containing compounds, manganese(II) chloride tetrahydrate, and any combination thereof. Examples of guanidine-containing compounds may include, but are not limited to, aganodine, agmatidine, agmatine, ambazone, amiloride, apraclonidine, aptiganel, argatroban, arginine, argininosuccinic acid, asymmetric dimethylarginine, benexate, benzamil, bethanidine, BIT225, blasticidin S, brostallicin, camostat, cariporide, chlorophenylbiguanide, cimetidine, ciraparantag, creatine, creatine ethyl ester, creatine methyl ester, creatinine, creatinolfosfate, 2-cyanoguanidine, cycloguanil, debrisoquine, dihydrostreptomycin, ditolylguanidine, E-64, ebrotidine, epinastine, eptifibatide, famotidine, glycocyamine, guanabenz, guanadrel, guanazodine, guanethidine, guanfacine, guanidine, guanidine nitrate, guanidinium chloride, guanidinium thiocyanate, 5'-guanidinonaltrindole, 6'-guanidinonaltrindole, guanidinopropionic acid, 3-guanidinopropionic acid, guanochlor, guanoxabenz, guanoxan, gusperimus, impromidine, kopexil, laninamivir, leonurine, lombricine, lugduname, metformin, methylarginine, mitoguazone, octopine, OUP-16, pentosidine, peramivir, phosphocreatine, picloxydine, pimagedine, polyhexamethylene guanidine, n-propyl-1-arginine, rimeporide, robenidine, saxitoxin, siguazodan, streptomycin, sucrononic acid, sulfaguanidine, synthalin, TAN-1057 A, TAN-1057 C, tegaserod, terbogrel, 1,1,3,3-tetramethylguanidine, tetrodotoxin, tomopenem, triazabicyclodecene, UR-AK49, vargulin, VUF-8430, zanamivir, and any combination thereof.

In certain embodiments, the thermoresponsive polymer may include a first monomer and a second monomer at a ratio of from about 99:1 to about 50:50 by weight percentage ratio of first monomer:second monomer. In some embodiments, the thermoresponsive polymer may include a first monomer and a second monomer at a ratio of from about 99:1 to about 80:20 by weight percentage ratio of first monomer:second monomer. In some embodiments, the thermoresponsive polymer may include a first monomer and a second monomer at a ratio of from about 95:5 by weight percentage ratio of first monomer:second monomer. In some embodiments, the thermoresponsive polymer may include a first monomer that is N-isopropylacrylamide and a second monomer that is butylacrylate, and the first monomer and the second monomer may be present at a ratio of about 95:5 by weight percentage ratio of first monomer:second monomer.

The thermoresponsive polymer may include the monomers in any configuration and the monomers may be repeated with any frequency or pattern, or in a random nature. One of ordinary skill in the art, with the benefit of this disclosure, will recognize that, in certain embodiments, a thermoresponsive polymer suitable for use in accordance with the methods of the present disclosure may be provided in an acid form and/or in a salt form. In certain embodiments, the thermally responsive hydrogel may include a thermoresponsive polymer that is a block copolymer. In some embodiments a block copolymer may clusters of the same monomer that form blocks of a repeating unit.

In certain embodiments, the thermoresponsive polymer optionally may be at least partially crosslinked. As used herein, the term "crosslink" and grammatical derivatives thereof refers to a bond linking one monomer or polymer chain to another polymer chain. The bond may be any bond, for example, covalent bond, ionic bond, and the like. One of ordinary skill in the art, with the benefit of this disclosure, will recognize crosslinkers that are suitable for use in accordance with the methods of the present disclosure. As used herein, the term "crosslinker" refers to a compound, element, or ion used to crosslink and that includes two or more olefinic bonds. Examples of crosslinkers that are suitable for use with the thermoresponsive polymer of the present disclosure include, but are not limited to, pentaerythritol allyl ether and methylenebisacrylamide.

In certain embodiments, the thermally responsive hydrogel may be a multipolymer interpenetrating polymeric hydrogel. In other embodiments, the multipolymer interpenetrating polymeric hydrogel may include two independent crosslinked components. In certain embodiments, the crosslinked components may be synthetic and/or natural components, which may be contained in a network form. In some embodiments, the thermally responsive hydrogel may be a semi-interpenetrating polymeric hydrogel. In certain embodiments, the semi-interpenetrating polymeric hydrogel may include a cross-linked polymer component and a non-cross-linked polymer component. In certain embodiments, the thermally responsive hydrogel may include a thermoresponsive polymer that may include at least one monomer that is grafted onto a cheaper polymeric material (e.g. starch). This may provide the properties of the thermally responsive hydrogel at a reduced cost.

In certain embodiments, the treatment fluids of the present disclosure may exhibit a viscosity of from about 2 centipoise (cP) to about 200 cP (for example, as measured with a rotational viscometer or a Brookfield BF35 Viscometer (Ametek®, Inc. Corp., Pennsylvania)). In some embodiments, the treatment fluids of the present disclosure may exhibit a viscosity of from about 25 cP to about 200 cP. In some embodiments, the treatment fluids of the present disclosure may exhibit a viscosity of from about 25 cP to about 50 cP. In some embodiments, the treatment fluids of the present disclosure may exhibit a viscosity of from about 50 cP to about 100 cP. In some embodiments, the treatment fluids of the present disclosure may exhibit a viscosity of from about 2 cP to about 25 cP. In some embodiments, the treatment fluids of the present disclosure may exhibit a viscosity of from about 2 cP to about 10 cP. In certain embodiments, the composition of a treatment fluid including a thermally responsive hydrogel may be altered to exhibit and/or maintain a certain viscosity at a certain temperature. In certain embodiments, this may involve altering the composition of a thermoresponsive polymer included in the thermally responsive hydrogel to tune its thickening transition temperature.

The thermally responsive hydrogels of the present disclosure may include a thermoresponsive polymer that undergoes a thickening transition that results in the viscosity of the treatment fluid increasing to a viscosity of from about 2 cP to about 250 cP at about or above a thickening transition temperature. In some embodiments, the thermally responsive hydrogels of the present disclosure may include a thermoresponsive polymer that undergoes a thickening transition that results in the viscosity of the treatment fluid increasing to a viscosity as low as any of 2, 3, 4, 6, 8, 10, 20, and 50 cP. In certain embodiments, the thermally responsive hydrogels of the present disclosure may include a thermoresponsive polymer that undergoes a thickening transition that results in the viscosity of the treatment fluid increasing to a viscosity as high as any of 20, 40, 60, 80, 100, 200, and 250 cP. In certain embodiments, the thermally responsive hydrogels of the present disclosure may include a thermoresponsive polymer that undergoes a thickening transition that results in the viscosity of the treatment fluid increasing to a viscosity of from about 2 cP to about 80 cP, in other embodiments, about 4 cP to about 60 cP, in other embodiments, about 8 cP to about 40 cP, in other embodiments, about 20 cP to about 100 cP, in other embodiments, about 20 cP to about 60 cP, in other embodiments, about 100 cP to about 250 cP.

The thermally responsive hydrogel of the present disclosure may include a thermoresponsive polymer that undergoes a thickening transition at a thickening transition temperature of from about 30° C. (86° F.) to about 210° C. (410° F.). In certain embodiments, the thermally responsive hydrogel of the present disclosure may include a thermoresponsive polymer that undergoes a thickening transition at a thickening transition temperature as low as any of 30, 35, 40, 45, 50, 55, 60, 65, 70, 75, 80, 85, 90, 95, 100, 105, 110, 115, 120, 125, and 130° C. In certain embodiments, a thermally responsive hydrogel of the present disclosure may include a thermoresponsive polymer that undergoes a thickening transition at a thickening transition temperature as high as any of 130, 140, 150, 160, 170, 180, 190, 200 and 210° C. In certain embodiments, a treatment fluid including the thermally responsive hydrogel may be introduced into at least a portion of a subterranean formation wherein the thickening transition temperature at which a thermoresponsive polymer included in the thermally responsive hydrogel undergoes a thickening transition is from about 30° C. (86° F.) to about 210° C. (410° F.), in other embodiments, about 50° C. (122° F.) to about 210° C. (410° F.), in other embodiments, about 75° C. (167° F.) to about 210° C. (410° F.), in other embodiments, about 100° C. (212° F.) to about 210° C. (410° F.), in other embodiments, about 125° C. (257° F.) to about 210° C. (410° F.), in other embodiments, about 125° C. (257° F.) to about 190° C. (374° F.), in other embodiments, about 125° C. (257° F.) to about 170° C. (338° F.), in other embodiments, about 125° C. (257° F.) to about 150° C. (302° F.). In certain embodiments, the thickening transition may include a liquid-to-solid phase change that occurs at about or above the thickening transition temperature. In certain embodiments, the thickening transition may be at least partially reversible, e.g. a solid thermally responsive hydrogel may become at least partially a liquid thermally responsive hydrogel as the temperature of the thermally responsive hydrogel is decreased to a temperature below the thickening transition temperature.

In some embodiments, the composition of the thermoresponsive polymers of the present disclosure may be altered to tune the thickening transition temperature. In certain embodiments, the composition of the thermoresponsive polymer may be altered to tune the thickening transition temperature at which a liquid-to-solid phase change occurs. In certain embodiments, the composition of the thermoresponsive polymer may be altered, for example, by changing the polymer composition, changing the polymer configuration, use of crosslinkers, addition of additives, and the like.

The thermally responsive hydrogel of the present disclosure may include a plurality of thermoresponsive polymers. In certain embodiments, the plurality of thermoresponsive polymers may have a plurality of thickening transition temperatures. In some embodiments, the thermally responsive hydrogel may include two, three, four, five, six, seven, eight, nine, or ten different thermoresponsive polymers. In other embodiments, the thermally responsive hydrogel may include more than ten thermoresponsive polymers. In certain embodiments, the inclusion of a plurality of thermoresponsive polymers in the thermally responsive hydrogel may provide a more gradual liquid-to-solid phase change and/or increase in viscosity with increasing temperature of the treatment fluid or the fluid in which the thermally responsive hydrogel is present.

The thermally responsive hydrogel used in accordance with the methods of the present disclosure should be present in a fluid in an amount sufficient to provide a desired viscosity at or above a thickening transition temperature. In certain embodiments, the thermally responsive hydrogel may be present in the fluid in an amount from about 1% to about 20% by weight of the fluid. In certain embodiments, the thermally responsive hydrogel may be present in the fluid in an amount from about 5% to about 20% by weight of the fluid. In certain embodiments, the thermally responsive hydrogel may be present in the fluid in an amount from about 10% to about 15% by weight of the fluid. In certain embodiments, the thermally responsive hydrogel may be present in the fluid in an amount of about 20% by weight of the fluid. In some embodiments, the thermally responsive hydrogel may be present in the fluid in an amount from about 1% to about 4%, in other embodiments, from about 4% to about 8%, in other embodiments, from about 8% to about 12%, in other embodiments, from about 12% to about 16%, and in other embodiments, from about 16% to about 20% by weight of the fluid.

In certain embodiments, the thermally responsive hydrogel may form a solid thermally responsive hydrogel at about, or above, a thickening transition temperature (e.g. at or above one or more of the thickening transition temperature ranges referenced above). In certain embodiments, the solid thermally responsive hydrogel may be present in a fluid at about, or above, a thickening transition temperature in an amount from about 0.01 to about 0.2 by volume fraction of solids of the fluid. In certain embodiments, the solid thermally responsive hydrogel may be present in the fluid at about, or above, a thickening transition temperature in amount from about 0.04 to about 0.2 by volume fraction of solids of the fluid. In certain embodiments, the solid thermally responsive hydrogel may be present in the fluid at about, or above, a thickening transition temperature in amount from about 0.04 to about 0.1 by volume fraction of solids of the fluid. In certain embodiments, the solid thermally responsive hydrogel may be present in the fluid in amount from about 0.01 to about 0.04, in other embodiments, from about 0.04 to about 0.08, in other embodiments, from about 0.08 to about 0.12, in other embodiments, from about 0.12 to about 0.16, in other embodiments, from about 0.16 to about 0.20 by volume fraction of solids of the fluid. As used herein, "volume fraction of solids" refers to the ratio of the volume of solids in a fluid to the total volume.

In certain embodiments, the treatment fluids used in accordance with the methods of the present disclosure optionally may include any number of additional additives. Examples of such additional additives include, but are not limited to, salts, surfactants, acids, proppant particulates, diverting agents, additional fluid loss control additives, gas, nitrogen, carbon dioxide, surface modifying agents, tackifying agents, foamers, corrosion inhibitors, scale inhibitors, catalysts, clay control agents, shale inhibitors, biocides, friction reducers, antifoam agents, bridging agents, flocculants, $H_2S$ scavengers, $CO_2$ scavengers, oxygen scavengers, lost circulation materials, lubricants, additional viscosifiers, breakers, weighting agents, relative permeability modifiers, resins, wetting agents, coating enhancement agents, filter cake removal agents, antifreeze agents (e.g., ethylene glycol or polyethylene glycol), and the like. In certain embodiments, one or more of these optional additives (e.g., a shale inhibitor) may be added to the treatment fluid and/or activated after the thermally responsive hydrogel has been at least partially hydrated in the fluid. A person skilled in the art, with the benefit of this disclosure, will recognize the types of additives that may be included in the fluids of the present disclosure for a particular application.

In certain embodiments, the treatment fluids used in accordance with the methods of the present disclosure optionally may include a weighting agent. In some embodiments, the weighting agent may be added to produce a desired density in the treatment fluid. In certain embodiments, the weighting agent may include barite. Examples of other weighting agents include, but are not limited to, hematite, magnetite, iron oxides, illmenite, siderite, celestite, dolomite, olivine, calcite, magnesium oxides, halites, calcium carbonate, strontium sulfate, manganese tetraoxide, and the like. A person skilled in the art, with the benefit of this disclosure, will recognize the types of weighting agent that may be included in the fluids of the present disclosure for a particular application.

In certain embodiments, the treatment fluids including a thermally responsive hydrogel optionally may include one or more surfactants. The surfactant may, among other purposes, help disperse the thermally responsive hydrogel and/or other additives in a treatment fluid. Examples of surfactants that may be suitable for use may include, but are not limited to, an alkoxylated alkyl alcohol and salts thereof, an alkoxylated alkyl phenol and salts thereof, an alkyl or aryl sulfonate, a sulfate, a phosphate, a carboxylate, a polyoxyalkyl glycol, a fatty alcohol, a polyoxyethylene glycol sorbitan alkyl ester, a sorbitan alkyl ester, a polysorbate, a glucoside, a quaternary amine compound, an amine oxide surfactant, or any combination thereof.

The treatment fluids of the present disclosure may be prepared using any suitable method and/or equipment (e.g., blenders, mixers, stirrers, etc.) known in the art at any time prior to their use. The treatment fluids may be prepared at a well site or at an offsite location.

The present disclosure in some embodiments provides methods for using the treatment fluids to carry out a variety of subterranean treatments or operations, including but not limited to, drilling operations, cementing operations, fracturing operations, gravel packing operations, workover operations, and the like. In some embodiments, the treatment fluids of the present disclosure may be drilling fluids used for drilling a wellbore into a subterranean formation. In certain embodiments, the drilling fluids may include a low concentration of solids, for example, the drilling fluids may be substantially free of added clays or other types of solids which may plug formation zones. As used herein, the term "added clay" refers to a clay added to a drilling fluid prior to the introduction of the drilling fluid into a subterranean formation.

In certain embodiments, a treatment fluid including a thermally responsive hydrogel may be introduced into a subterranean formation. In certain embodiments, the subterranean formation may have a bottom hole temperature of from about 66° C. (150° F.) to about 204° C. (400° F.). In certain embodiments, the subterranean formation may have a bottom hole temperature of from about 93° C. (200° F.) to about 204° C. (400° F.). In certain embodiments, the subterranean formation may have a bottom hole temperature of from about 93° C. (200° F.) to about 177° C. (350° F.). In certain embodiments, the subterranean formation may have a bottom hole temperature of at least 177° C. (350° F.). In some embodiments, the treatment fluid including the thermally responsive hydrogel may be used to drill at least a portion of a wellbore in the subterranean formation. In some embodiments, the treatment fluid may circulate through the wellbore while drilling into the subterranean formation. In some embodiments, the treatment fluid including the thermally responsive hydrogel may be introduced into a wellbore that penetrates a subterranean formation. In certain embodiments, the treatment fluid including a thermally responsive hydrogel may be chilled before being introduced into a location (e.g. a subterranean formation). In certain embodiments, this may allow for the management of the treatment fluid such that it may be pumped to a specific location before the thermally responsive hydrogel at least partially solidifies. In certain embodiments, the solidification of the thermally responsive hydrogel may be at least partially reversible, e.g. a solid thermally responsive hydrogel may become at least partially a liquid thermally responsive hydrogel as the temperature of the thermally responsive hydrogel is decreased to a temperature below a thickening transition temperature. In certain embodiments, a bottom hole temperature may be high (e.g. one or more of the temperatures referenced above) and the treatment fluid may be chilled to a temperature much lower than ambient (e.g. to a temperature below 10° C.). In other embodiments, a freezing point inhibitor (e.g. ethylene glycol or polyethylene glycol and/or a salt) may be included and the treatment fluid may be chilled to a temperature at about or below 0° C.

In some embodiments, the methods of the present disclosure may include foaming the treatment fluid by incorporating air, nitrogen, an appropriate foamer, glass spheres, or any combination thereof into the fluid. In certain embodiments, the treatment fluid may be introduced into the wellbore using one or more pumps. In some embodiments, the thermally responsive hydrogel, treatment fluids, and/or additional additives may be used in treating a portion of a subterranean formation, for example, in acidizing treatments such as matrix acidizing or fracture acidizing. In some embodiments, the treatment fluid including the thermally responsive hydrogel may be introduced at a pressure sufficient to create or enhance one or more fractures within the subterranean formation (e.g., hydraulic fracturing).

In certain embodiments of the present disclosure, the treatment fluids of the present disclosure may be introduced into a subterranean formation, a wellbore penetrating a subterranean formation, tubing (e.g., pipeline), and/or a container using any method or equipment known in the art. Introduction of the treatment fluids of the present disclosure may in such embodiments include delivery via any of a tube, umbilical, pump, gravity, and combinations thereof. The treatment fluids of the present disclosure may, in various embodiments, be delivered downhole (e.g., into the wellbore) or into top-side flowlines/pipelines or surface treating equipment. For example, in certain embodiments, the treatment fluids of the present disclosure may be introduced into a subterranean formation and/or wellbore using batch treatments, squeeze treatments, continuous treatments, and/or combinations thereof.

For example, in certain embodiments, the thermally responsive hydrogel, treatment fluids, and/or additional additives of the present disclosure may be introduced into a subterranean formation and/or wellbore using batch treatments, squeeze treatments, continuous treatments, and/or combinations thereof. In certain embodiments, a batch treatment may be performed in a subterranean formation by stopping production from the well and pumping a certain amount of the thermally responsive hydrogel, treatment fluids, and/or additional additives into a wellbore, which may be performed at one or more points in time during the life of a well. In other embodiments, a squeeze treatment may be performed by dissolving the thermally responsive hydrogel, treatment fluids, and/or additional additives in a suitable solvent at a suitable concentration and squeezing that solvent carrying the thermally responsive hydrogel or additional additives downhole into the formation, allowing production out of the formation to bring the thermally responsive hydrogel or additional additives to the desired location.

In some embodiments, the present disclosure provides methods for using the thermally responsive hydrogel, treatment fluids, and/or additional additives to carry out a variety of subterranean treatments, including but not limited to, preflush treatments, afterflush treatments, hydraulic fracturing treatments, acidizing treatments, sand control treatments (e.g., gravel packing), "frac-pack" treatments, wellbore clean-out treatments, drilling operations, and other operations where a treatment fluid may be useful. Such treatment fluids may include, but are not limited to, drilling fluids, preflush fluids, afterflush fluids, fracturing fluids, acidizing fluids, gravel packing fluids, packer fluids, spacer fluids, and the like.

In the methods of the present disclosure, the thermally responsive hydrogel may be added to, or included in, a treatment fluid in any amount that may effectively thicken a fluid to be treated by a desired amount at a desired temperature. In certain embodiments, an initial amount of thermally responsive hydrogel may be added to a treatment fluid followed by subsequent, additional amounts. This technique may be used to increase and/or maintain a concentration of thermally responsive hydrogel that may be sufficient to maintain a desired viscosity in a fluid to be treated throughout the course of a given operation.

The treatment fluids of the present disclosure may directly or indirectly affect one or more components or pieces of equipment associated with the preparation, delivery, recapture, recycling, reuse, and/or disposal of the disclosed treatment fluids. For example, and with reference to FIG. 1, the disclosed treatment fluids may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed treatment fluids may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed treatment fluids may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed treatment fluids may be stored, reconditioned, and/or regulated until added to the drilling fluid 122.

As mentioned above, the disclosed treatment fluids may directly or indirectly affect the components and equipment of the drilling assembly 100. For example, the disclosed treatment fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary treatment fluids.

The disclosed treatment fluids may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The disclosed treatment fluids may also directly or indirectly affect the mixing hopper 134 and the retention pit 132 and their assorted variations.

The disclosed treatment fluids may also directly or indirectly affect the various downhole equipment and tools that may come into contact with the treatment fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treatment fluids may also directly or indirectly affect any downhole heat exchangers, valves and corresponding actuation devices, tool seals, packers and other wellbore isolation devices or components, and the like associated with the wellbore 116. The disclosed treatment fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed treatment fluids may also directly or indirectly affect any transport or delivery equipment used to convey the treatment fluids to the drilling assembly 100 such as, for example, any conduits, pipelines, trucks, tubulars, and/or pipes used to fluidically move the treatment fluids from one location to another, any pumps, compressors, or motors used to drive the treatment fluids into motion, any valves or related joints used to regulate the pressure or flow rate of the treatment fluids, and any sensors (i.e., pressure and temperature), gauges, and/or combinations thereof, and the like.

An embodiment of the present disclosure is a method including introducing a treatment fluid including an aqueous base fluid and a thermally responsive hydrogel including at least one thermoresponsive polymer into at least a portion of a subterranean formation.

Another embodiment of the present disclosure is a method of drilling a wellbore in a subterranean formation including using a drilling fluid including an aqueous base fluid and a thermally responsive hydrogel including at least one thermoresponsive polymer to drill at least a portion of a wellbore in the subterranean formation.

Another embodiment of the present disclosure is a method including introducing a treatment fluid including an aqueous base fluid and a thermally responsive hydrogel including at least one thermoresponsive polymer into at least a portion of a subterranean formation; and allowing the at least one thermoresponsive polymer to undergo an at least partially reversible thickening transition at about, or above, a thickening transition temperature.

Another embodiment of the present disclosure is a method including introducing a treatment fluid including an aqueous base fluid and a thermally responsive hydrogel including at least one thermoresponsive polymer into at least a portion of a subterranean formation, wherein the aqueous base fluid includes at least one component selected from the group consisting of: water, salt water, brine, seawater, and any combination thereof. Optionally in this embodiment or any other embodiment disclosed herein, the thermally responsive hydrogel is present in the treatment fluid in an amount from about 1% to about 20% by weight of the treatment fluid. Optionally in this embodiment or any other embodiment of the present disclosure, the method further includes chilling the treatment fluid prior to introducing the treatment fluid into the at least a portion of the subterranean formation. Optionally in this embodiment or any other embodiment of the present disclosure, the method further includes circulating the treatment fluid through a wellbore while drilling into the subterranean formation. Optionally in this embodiment or any other embodiment of the present disclosure, the thermally responsive hydrogel includes a hydrogel selected from the group consisting of: a multipolymer interpenetrating polymeric hydrogel, a semi-interpenetrating polymer hydrogel, and any combination thereof. Optionally in this embodiment or any other embodiment of the present disclosure, the at least one thermoresponsive polymer includes at least one monomer selected from the group consisting of: N-isopropylacrylamide, hydroxyethyl methacrylate, acrylamide, N,N-diethylacrylamide, N-ethylacrylamide, N-methylacrylamide, N-n-butylacrylamide, N-tert-butylacrylamide, butyl acrylate, ethyl acrylate, propyl acrylate, methacrylamide, a methacrylate, methyl vinyl ether, N-vinyl-caprolactam, polypeptides, ethylene oxide, propylene oxide, pluronic F-127, chitosan, any salt thereof, and any combination thereof. Optionally in this embodiment or any other embodiment of the present disclosure, the at least one thermoresponsive polymer undergoes a thickening transition at a thickening transition temperature of from about 30° C. to about 210° C. Optionally in this embodiment or any other embodiment of the present disclosure, a viscosity of the treatment fluid increases to a viscosity of from about 2 cP to about 250 cP at about or above a thickening transition temperature. Optionally in this embodiment or any other embodiment of the present disclosure, the thermally responsive hydrogel includes a plurality of thermoresponsive polymers having a plurality of thickening transition temperatures.

Another embodiment of the present disclosure is a method of drilling a wellbore in a subterranean formation including using a drilling fluid including an aqueous base fluid and a thermally responsive hydrogel including at least one thermoresponsive polymer to drill at least a portion of a wellbore in the subterranean formation, wherein the aqueous base fluid includes at least one component selected from the group consisting of: water, salt water, brine, seawater, and any combination thereof. Optionally in this embodiment or any other embodiment disclosed herein, the thermally responsive hydrogel is present in the drilling fluid in an amount from about 1% to about 20% by weight of the drilling fluid. Optionally in this embodiment or any other embodiment of the present disclosure, the at least one thermoresponsive polymer includes at least one monomer selected from the group consisting of: N-isopropylacrylamide, hydroxyethyl methacrylate, acrylamide, N,N-diethylacrylamide, N-ethylacrylamide, N-methylacrylamide, N-n-butylacrylamide, N-tert-butylacrylamide, butyl acrylate, ethyl acrylate, propyl acrylate, methacrylamide, a methacrylate, methyl vinyl ether, N-vinyl-caprolactam, polypeptides, ethylene oxide, propylene oxide, pluronic F-127, chitosan, any salt thereof, and any combination thereof. Optionally in this embodiment or any other embodiment of the present disclosure, the at least one thermoresponsive polymer undergoes a thickening transition at a thickening transition temperature of from about 30° C. to about 210° C. Optionally in this embodiment or any other embodiment of the present disclosure, a viscosity of the drilling fluid increases to a viscosity of from about 2 cP to about 250 cP at about or above a thickening transition temperature. Optionally in this embodiment or any other embodiment of the present disclosure, the thermally responsive hydrogel includes a plurality of thermoresponsive polymers having a plurality of thickening transition temperatures.

Another embodiment of the present disclosure is a method including introducing a treatment fluid including an aqueous base fluid and a thermally responsive hydrogel including at least one thermoresponsive polymer into at least a portion of a subterranean formation; and allowing the at least one thermoresponsive polymer to undergo an at least partially reversible thickening transition at about, or above, a thickening transition temperature, wherein the thickening transition temperature is from about 30° C. to about 210° C. Optionally in this embodiment or any other embodiment disclosed herein, a viscosity of the treatment fluid increases to a viscosity of from about 2 cP to about 250 cP at about or above the thickening transition temperature.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Figure 2A:
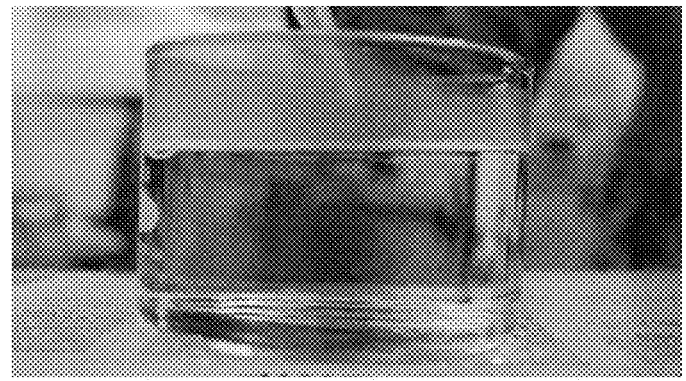
FIGS. 2A and 2B are photographs of an example of a thermally responsive hydrogel before and after injection into water at 37° C., in accordance with certain embodiments of the present disclosure.
Figure 2B:
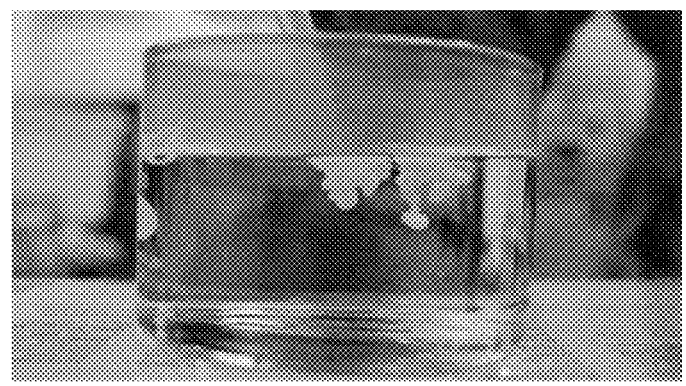

The following examples demonstrate calculations conducted to evaluate the ability of the thermally responsive hydrogel to provide for high temperature viscosity in a water-based mud according to some embodiments of the present disclosure. FIGS. 2A and 2B are photographs of an example of a thermally responsive hydrogel before (FIG. 2A) and after (FIG. 2B) injection into water at 37° C., demonstrating that the thermally responsive hydrogel may form a solid when the temperature of the hydrogel increases to a temperature above the thickening transition temperature.

A Krieger-Dougherty modified model was used to predict the impact of the liquid-to-solid phase change of a thermally responsive hydrogel on the apparent viscosity of a fluid in which the thermally responsive hydrogel is present. This modified model demonstrates an increase in the viscosity of the fluid when particles are added, which depends on the concentration of the particles according to the following equation:

$$\frac{\eta}{\eta_0} = \left(1 - \frac{\phi}{\phi_m}\right)^{-[\eta]\phi_m} \quad \text{(Equation 1)}$$

where η=apparent viscosity of the water-based mud suspension $\eta_0$=apparent viscosity of the continuous fluid medium in the water-based mud suspension

[η]=the intrinsic viscosity, which is assumed to be 2.5 for spheres in this calculation Φ=the volume fraction of solids of the solid thermally responsive hydrogel and $\Phi_m$=the maximum packing fraction of the solid thermally responsive hydrogel.

Equation 1 was combined with the Arrhenius Model (using a simplified exponential model) to demonstrate the general performance potential of a thermally responsive hydrogel on drilling fluid viscosity according to Equation 2:

$$\eta(T)=\eta_0 e^{-bT} \quad \text{(Equation 2)}$$

where T=the absolute temperature (in Kelvin)
and b=a decay composition constant.

Example 1

In this example, the apparent viscosity of a thermally responsive hydrogel including one thermoresponsive polymer with a single thickening transition temperature of 243° F. in a 12.0 lbs/gal water-based drilling fluid was calculated using the model described above. A solid weighting agent of barite was added to produce the desired weight of the drilling fluid. The results of these calculations are shown in FIG. 3. Referring now to FIG. 3, plot 300 shows the apparent viscosity in cP on axis 310 against temperature in ° F. on axis 320 for a total volume fraction of solids (Vf) of the solid thermally responsive hydrogel, ϕ, of 0 (base fluid 330) 0.08 (340), 0.12 (350), and 0.16 (360). Plot 300 also shows the change in volume fraction of solids of the solid thermally responsive hydrogel on axis 370 against temperature in ° F. on axis 320 for ϕ f 0.08 (341), 0.12 (351), and 0.16 (361) as the thickening transition at 243° F. takes place. FIG. 3 demonstrates that the apparent viscosity of a fluid that includes a thermally responsive hydrogel is expected to increase as the thickening transition temperature is reached. The larger the value of ϕ, the larger the apparent viscosity increase at the transition temperature. FIG. 3 also shows that the volume fraction of solids of a thermally responsive hydrogel material with a single thickening transition temperature is expected to increase in a single step at the thickening transition temperature. These results demonstrate that the thermally responsive hydrogel may increase the apparent viscosity of a drilling fluid upon an increase in temperature to or above the thickening transition temperature.

Example 2

In this example, the apparent viscosity of a thermally responsive hydrogel including two different thermoresponsive polymers with different thickening transition temperatures of 243 and 318° F. in a 12.0 lbs/gal water-based drilling fluid was calculated using the model described above. A solid weighting agent of barite was added to produce the desired weight of the drilling fluid. The results of these calculations are shown in FIG. 4. Referring now to FIG. 4, plot 400 shows the apparent viscosity in cP on axis 410 against temperature in ° F. on axis 420 for a total volume fraction of solids (Vf) of the solid thermally responsive hydrogel, ϕ, of 0 (base fluid 430) 0.08 (440), 0.12 (450), and 0.16 (460). Plot 400 also shows the change in volume fraction of solids of the solid thermally responsive hydrogel on axis 470 against temperature in ° F. on axis 320 for ϕ of 0.08 (441), 0.12 (451), and 0.16 (461) as the thickening transitions at 243 and 318° F. take place. FIG. 4 demonstrates that the volume fraction of solids of a thermally responsive hydrogel material with two thickening transition temperatures is expected to increase sequentially in a step-wise manner with an increase at each of the two thickening transition temperatures of 243 and 318° F.

Example 3

In this example, the apparent viscosity of a thermally responsive hydrogel that including seven different thermoresponsive polymers with seven different thickening transition temperatures of 243, 268, 293, 318, 343, 368 and 318° F. in a 12.0 lbs/gal water-based drilling fluid was calculated using the model described above. A solid weighting agent of barite was added to produce the desired weight of the drilling fluid. The results of these calculations are shown in FIG. 5. Referring now to FIG. 5, plot 500 shows the apparent viscosity in cP on axis 510 against temperature in ° F. on axis 520 for a total volume fraction of solids (Vf) of the solid thermally responsive hydrogel, ϕ, of 0 (base fluid 530) 0.08 (540), 0.12 (550), and 0.16 (560). Plot 500 also shows the change in volume fraction of solids of the solid thermally responsive hydrogel on axis 570 against temperature in ° F. on axis 320 for ϕ of 0.08 (541), 0.12 (551), and 0.16 (561) as the thickening transitions at 243, 268, 293, 318, 343, 368 and 318° F. take place. FIG. 5 demonstrates that the volume fraction of solids of a thermally responsive hydrogel material with seven thickening transition temperatures is expected to increase sequentially with a smooth transition. Thus, different thermoresponsive polymers with different thickening transition temperatures included in a thermally responsive hydrogel may produce a more gradual change in the volume fraction of solids with increasing temperature.

Example 4

In this example, the apparent viscosity of a thermally responsive hydrogel including one thermoresponsive polymer with a single thickening transition temperature of 243° F. in a 16.0 lbs/gal water-based drilling fluid was calculated using the model described above. A solid weighting agent of barite was added to produce the desired weight of the drilling fluid. The results of these calculations are shown in FIG. 6. Referring now to FIG. 6, plot 600 shows the apparent viscosity in cP on axis 610 against temperature in ° F. on axis 620 for a total volume fraction of solids (Vf) of the solid thermally responsive hydrogel, ϕ, of 0 (base fluid 630) 0.08 (640), 0.12 (650), and 0.16 (660). Plot 600 also shows the change in volume fraction of solids of the solid thermally responsive hydrogel on axis 670 against temperature in ° F. on axis 620 for ϕ of 0.08 (641), 0.12 (651), and 0.16 (661) as the thickening transition at 243° F. takes place. FIG. 6 demonstrates that the apparent viscosity of a fluid that includes a thermally responsive hydrogel is expected to increase as the thickening transition temperature is reached, and that this increase is expected to be larger for a 16.0 lbs/gal drilling fluid as compared to the 12.0 lbs/gal drilling fluid in Example 1. The larger the value of ϕ, the larger the expected increase in apparent viscosity at the transition temperature. FIG. 6 also shows that the volume fraction of solids of a thermally responsive hydrogel material with a single thickening transition temperature is expected to increase in a single step at the thickening transition temperature. These results demonstrate that the thermally responsive hydrogel may increase the apparent viscosity of a drilling fluid upon an increase in temperature to or above the thickening transition temperature, and that this increase is related to the weight of the drilling fluid.

Example 5

In this example, the apparent viscosity of a thermally responsive hydrogel including two different thermoresponsive polymers with different thickening transition temperatures of 243 and 318° F. in a 16.0 lbs/gal water-based drilling fluid was calculated using the model described above. A solid weighting agent of barite was added to produce the desired weight of the drilling fluid. The results of these calculations are shown in FIG. 7. Referring now to FIG. 7, plot 700 shows the apparent viscosity in cP on axis 710 against temperature in ° F. on axis 720 for a total volume fraction of solids (Vf) of the solid thermally responsive hydrogel, $\phi$, of 0 (base fluid 730) 0.08 (740), 0.12 (750), and 0.16 (760). Plot 700 also shows the change in volume fraction of solids of the solid thermally responsive hydrogel on axis 770 against temperature in ° F. on axis 720 for $\phi$ of 0.08 (741), 0.12 (751), and 0.16 (761) as the thickening transitions at 243 and 318° F. take place. FIG. 7 demonstrates that the apparent viscosity of a fluid that includes a thermally responsive hydrogel is expected to increase as the thickening transition temperatures are reached, and that these increases are expected to be larger for a 16.0 lbs/gal drilling fluid as compared to the 12.0 lbs/gal drilling fluid in Example 2. FIG. 7 also demonstrates that the volume fraction of solids of a thermally responsive hydrogel material with two thickening transition temperatures is expected to increase sequentially in a stepwise manner with an increase at each of the two thickening transition temperatures of 243 and 318° F.

Example 6

In this example, the apparent viscosity of a thermally responsive hydrogel including seven different thermoresponsive polymers with seven different thickening transition temperatures of 243, 268, 293, 318, 343, 368 and 318° F. in a 16.0 lbs/gal water-based drilling fluid was calculated using the model described above. A solid weighting agent of barite was added to produce the desired weight of the drilling fluid. The results of these calculations are shown in FIG. 8. Referring now to FIG. 8, plot 800 shows the apparent viscosity in cP on axis 810 against temperature in ° F. on axis 820 for a total volume fraction of solids (Vf) of the solid thermally responsive hydrogel, $\phi$, of 0 (base fluid 830) 0.08 (840), 0.12 (850), and 0.16 (860). Plot 800 also shows the change in volume fraction of solids of the solid thermally responsive hydrogel on axis 870 against temperature in ° F. on axis 820 for $\phi$ of 0.08 (841), 0.12 (851), and 0.16 (861) as the thickening transitions at 243, 268, 293, 318, 343, 368 and 318° F. take place. FIG. 8 demonstrates that the apparent viscosity of a fluid that includes a thermally responsive hydrogel is expected to increase as the thickening transition temperatures are reached, and that these increases are expected to be larger for a 16.0 lbs/gal drilling fluid as compared to the 12.0 lbs/gal drilling fluid in Example 3. FIG. 8 also demonstrates that the volume fraction of solids of a thermally responsive hydrogel material with seven thickening transition temperatures is expected to increase sequentially with a smooth transition. Thus, different thermoresponsive polymers with different thickening transition temperatures included in the thermally responsive hydrogel may produce a more gradual change in the volume fraction of solids with increasing temperature.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    introducing a treatment fluid comprising an aqueous base fluid and a thermally responsive hydrogel comprising at least one thermoresponsive polymer into at least a portion of a subterranean formation;
    allowing the thermally responsive hydrogel to reach a thickening transition temperature, wherein the thermally responsive hydrogel undergoes a liquid-to-solid phase change at or above the thickening transition temperature; and
    allowing the treatment fluid to at least partially solidify in the subterranean formation, wherein the solid thermally responsive hydrogel is present in the treatment fluid in an amount from about 0.01 to about 0.2 by volume fraction of solids of the treatment fluid.

2. The method of claim 1, wherein the aqueous base fluid comprises at least one component selected from the group consisting of: water, salt water, brine, seawater, and any combination thereof.

3. The method of claim 1 wherein the thermally responsive hydrogel is present in the treatment fluid in an amount from about 1% to about 20% by weight of the treatment fluid.

4. The method of claim 1, further comprising chilling the treatment fluid prior to introducing the treatment fluid into the at least a portion of the subterranean formation.

5. The method of claim 1 further comprising circulating the treatment fluid through a wellbore while drilling into the subterranean formation.

6. The method of claim 1, wherein the thermally responsive hydrogel comprises a hydrogel selected from the group consisting of: a multipolymer interpenetrating polymeric hydrogel, a semi-interpenetrating polymer hydrogel, and any combination thereof.

7. The method of claim 1, wherein the at least one thermoresponsive polymer comprises at least one monomer selected from the group consisting of: N-isopropylacrylamide, hydroxyethyl methacrylate, acrylamide, N,N-diethylacrylamide, N-ethylacrylamide, N-methylacrylamide, N-n-butylacrylamide, N-tert-butylacrylamide, butyl acrylate, ethyl acrylate, propyl acrylate, methacrylamide, a methacrylate, methyl vinyl ether, N-vinyl-caprolactam, polypeptides, ethylene oxide, propylene oxide, pluronic F-127, chitosan, any salt thereof, and any combination thereof.

8. The method of claim 1, wherein the at least one thermoresponsive polymer undergoes a thickening transition at a thickening transition temperature of from about 30° C. to about 210° C.

9. The method of claim 1, wherein a viscosity of the treatment fluid increases to a viscosity of from about 2 cP to about 250 cP at about or above a thickening transition temperature.

10. The method of claim 1, wherein the thermally responsive hydrogel comprises a plurality of thermoresponsive polymers having a plurality of thickening transition temperatures.

11. A method of drilling a wellbore in a subterranean formation, the method comprising:
using a drilling fluid comprising an aqueous base fluid and a thermally responsive hydrogel comprising at least one thermoresponsive polymer to drill at least a portion of a wellbore in the subterranean formation;
allowing the thermally responsive hydrogel to reach a thickening transition temperature, wherein the thermally responsive hydrogel undergoes a liquid-to-solid phase change at or above the thickening transition temperature; and
allowing the drilling fluid to at least partially solidify in the subterranean formation, wherein the solid thermally responsive hydrogel is present in the drilling fluid in an amount from about 0.01 to about 0.2 by volume fraction of solids of the drilling fluid.

12. The method of claim 11, wherein the aqueous base fluid comprises at least one component selected from the group consisting of: water, salt water, brine, seawater, and any combination thereof.

13. The method of claim 11 wherein the thermally responsive hydrogel is present in the drilling fluid in an amount from about 1% to about 20% by weight of the drilling fluid.

14. The method of claim 11, wherein the at least one thermoresponsive polymer comprises at least one monomer selected from the group consisting of: N-isopropylacrylamide, hydroxyethyl methacrylate, acrylamide, N,N-diethylacrylamide, N-ethylacrylamide, N-methylacrylamide, N-n-butylacrylamide, N-tert-butylacrylamide, butyl acrylate, ethyl acrylate, propyl acrylate, methacrylamide, a methacrylate, methyl vinyl ether, N-vinyl-caprolactam, polypeptides, ethylene oxide, propylene oxide, pluronic F-127, chitosan, any salt thereof, and any combination thereof.

15. The method of claim 11, wherein the at least one thermoresponsive polymer undergoes a thickening transition at a thickening transition temperature of from about 30° C. to about 210° C.

16. The method of claim 11, wherein a viscosity of the drilling fluid increases to a viscosity of from about 2 cP to about 250 cP at about or above a thickening transition temperature.

17. The method of claim 11, wherein the thermally responsive hydrogel comprises a plurality of thermoresponsive polymers having a plurality of thickening transition temperatures.

18. A method comprising:
introducing a treatment fluid comprising an aqueous base fluid and a thermally responsive hydrogel comprising at least one thermoresponsive polymer into at least a portion of a subterranean formation;
allowing the at least one thermoresponsive polymer to undergo an at least partially reversible thickening transition at about, or above, a thickening transition temperature;
allowing the treatment fluid to at least partially solidify in the subterranean formation;
allowing the thickening transition of the at least one thermoresponsive polymer to at least partially reverse about, or below, the thickening transition temperature, wherein the at least partially solidified treatment fluid undergoes a solid-to-liquid phase change at about, or below, the thickening transition temperature.

19. The method of claim 18, wherein the thickening transition temperature is from about 30° C. to about 210° C.

20. The method of claim 18, wherein a viscosity of the treatment fluid increases to a viscosity from about 2 cP to about 250 cP at about or above the thickening transition temperature.

* * * * *